United States Patent [19]

Thomas

[11] 4,264,350
[45] Apr. 28, 1981

[54] METHOD OF TREATING GLASS FORMING MOLDS AND THE LIKE

[75] Inventor: Ian M. Thomas, Temperance, Mich.
[73] Assignee: Owens-Illinois, Inc., Toledo, Ohio
[21] Appl. No.: 82,511
[22] Filed: Oct. 9, 1979
[51] Int. Cl.$^3$ ............................................. C03B 40/02
[52] U.S. Cl. .......................................... 65/26; 65/24; 65/374 RM
[58] Field of Search ...................... 65/28, 26, 374 RM; 252/12, 28, 46.6

[56] References Cited

U.S. PATENT DOCUMENTS

| | | | |
|---|---|---|---|
| 2,982,727 | 5/1961 | Pattenden et al. | 252/28 X |
| 3,994,847 | 11/1976 | Macantonio et al. | 65/24 X |
| 4,003,867 | 1/1977 | Cooper et al. | 65/26 X |

Primary Examiner—Arthur D. Kellogg
Attorney, Agent, or Firm—E. J. Holler

[57] ABSTRACT

The present invention relates to a process for treating molten glass contacting surfaces including forming molds, gob chutes, neck rings, and the like, with an organic solution of a metal organic phosphate having a finely-divided lubricious filler dispersed therein, the dispersion being used to coat such glass contacting surfaces and the coating being heated to form a degradation product having improved glass releasing and wear-resistant properties. The coating forms a solid film lubricant especially adapted for use in manufacturing glass articles providing quick release of the molded glass articles, a protective lubricant layer for the glass contacting surfaces, and eliminating the need for frequent swabbing of such surfaces, especially mold surfaces with oily compositions.

18 Claims, No Drawings

METHOD OF TREATING GLASS FORMING MOLDS AND THE LIKE

BACKGROUND OF THE INVENTION

1. Field of the Invention

The present invention relates to the treatment of molten glass contacting surfaces employed in manufacturing glass articles, and more particularly to a process of treating such surfaces with an organic solution of metal organic phosphate having dispersed therein a finely-divided lubricious filler, the suspension being adapted to forming a degradation product on such surfaces on heating to enhance the rapid release of the newly-formed glass articles from molding and handling surfaces, and to protect such surfaces from excessive wear.

2. Description of the Prior Art

In conventional glass forming processes employed in the molding of glass containers, such as bottles, jars, and the like, the mold surfaces are frequently treated with a release coating by a technique known as swabbing. Normally, swabbing of glass molds is carried out by the utilization of a mop-like brush and a swabbing composition or compound which is placed upon the surface of the glass molds by brushing the mold forming surfaces with the compound. In many cases, the swabbing compound is composed of a mineral oil base with a lubricant, such as powdered graphite, and in some cases a wetting agent. Such material is brushed or "swabbed" upon the glass molds on the surfaces at which the glass comes in contact with the mold and this is accomplished every 5 to 30 minutes. The swabbing composition, placed onto the mold, is used to form a quick release surface for the glass which is being formed and utilization of this material decreases the chances of blemishes or defects on the glass container surfaces and protects the mold itself. Some compounds utilized in making swabbing materials include graphite, oil, sulfur and cork. These materials, when subject to the heat provided by the molten glass, produce corrosive materials, specifically sulfuric acid, which attacks the exposed metals of the mold and other glass forming equipment. Furthermore, because of the manual swabbing techniques, where the material is applied by the operator to the glass molds, uneven coatings or swabbing may be harmful. As a result, over a period of time, there is a build-up of mold swabbing composition residue, from burn-off within the mold, and this build-up can cause the formation of a defective and undesirable glass container. The oil swabbing materials frequently result in molded glass containers which are discolored or blemished and must be rejected.

Additionally, the use of oily swabbing compounds result in a great deal of smoke and airborne residue due to the heat at which the glass molds and equipment are operated in order to produce and form the glass containers. As a result, conventional swabbing techniques, with oil, create significant problems to the environment with respect to air pollution.

The utilization of solid film lubricants or quick release agents on the surface of the glass molds is useful in that such practice employs a coating for the glass molds and at the same time provides a quick release of the newly-formed article. This virtually forms a complete protective coating for the mold surface and avoids the disadvantages of the swabbing technique which were previously stated.

However, in many cases, for example U.S. Pat. Nos. 4,003,867, 3,977,885, 3,783,013, and 3,994,847, various types of metal-phosphate binder solution are disclosed which are aqueous and strongly acidic. The main objection to these particular binding solutions which form a coating upon the mold is that while they are difficult to apply, more to the point, they are extremely corrosive to the substrate, usually a metal such as steel. Aqueous solutions when applied normally require a spray application to a hot metallic substrate so that the water is flashed off rapidly and the binder converted to a neutral salt thereby minimizing corrosive reactions. In order to accomplish the necessary treatment for glass container molds, a number of very thin coatings is required, each being allowed to dry before the next coating application is carried out. Obviously, these methods are not readily adaptable to production where rapid, foolproof applications are preferred and a known thickness of resultant coating is required. This invention provides a process for treating the molds and other glass handling equipment used in the manufacturing of glass containers and other glass articles which avoids the disadvantages of the prior art with respect to aqueous solutions.

SUMMARY OF THE INVENTION

The invention described herein involves the preparation of a dispersion of a finely-divided lubricious filler in an essentially anhydrous organic solution of a metal organic phosphate compound which may contain anhydrous organic diluents and which dispersion, upon heating, converts to the degradation product of the metal organic phosphate material and lubricious filler to form a continuous imperforate coating for high temperature forming equipment. The coating is improved over that obtained previously from aqueous solutions in having greater uniformity and longer life, as well as ease of application. The new system is non-aqueous and non-ionic and, therefore, non-acidic. Thus, no corrosive or other detrimental reaction with cast iron, steel or other metal which makes up the mold substrate occurs and the organic solution with lubricating filler allows easy spray application of composite mixtures to give smooth uniform coatings. The uniform coating, after heating, provided on mold forming surfaces facilitates the release of the glass container or other formed articles and at the same time protects the surface of the mold for longer life. The coating may also be employed on other hot glass contacting surfaces such as gob chutes, neck rings, and dead plates, as well as hot end conveyors as known in the art.

DETAILED DESCRIPTION OF THE PREFERRED EMBODIMENT

This invention relates to a process for treating glass forming molds utilized in the making of glass containers, as well as other hot glass handling surfaces of related equipment. The preferred method is to clean the surfaces of such molds and apply directly to the surface a metal organic phosphate, along with a finely-divided lubricious filler, which phosphate is soluble in an anhydrous organic solvent with anhydrous dilutants. After heating to 200° C. or higher, this material is converted to a solid film lubricant, antiwear refractory agent and protective coating for the mold surface. The antiwear lubricious component of the solid film lubricant may be a filler of any of several solid refractory lubricants such as boron nitride, graphite, carbon black, etc. Graphite is a preferred solid lubricant in accordance with this invention. The size of the solid lubricant particles is not critical but they must be finely-divided, preferably in the 0.5–50 micron range. Mixtures of graphites may be used advantageously.

ALUMINUM ORGANIC PHOSPHATE SOLUTIONS

The aluminum organic phosphates are prepared by the reaction between an aluminum alkoxide and phosphoric acid in an anhydrous solvent such as methoxy-, ethoxy- or butoxy-ethanol or methanol. Generally mixtures are prepared which contain aluminum to phosphorus ratios of 1.0/2.0 to 3.5 and higher, although ratios of 1.0/2.5–3.0 are preferred and the final products are normally clear viscous colorless solutions with a solids content of about 30 percent by weight.

The structures of the aluminum organic phosphates are extremely complex but will contain metal-oxygen-phosphorus linkages, hydroxyl groups and alkoxy groups formed by reactions such as the following:

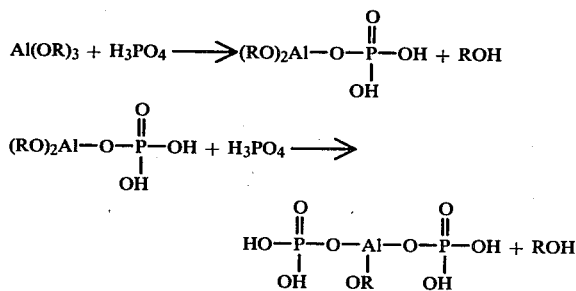

The aluminum alkoxide is represented by the formula $Al(OR)_3$ where R represents an alkyl group $C_nH_{2n+1}$ or alkoxyethyl group $C_nH_{2n+1}OC_2H_4$, where n is from 1 to 4. It is convenient to use the alkoxy group, OR, corresponding to the solvent used for the reaction, i.e., methoxide for methanol solvent and methoxyethoxide for methoxyethanol. In this way, the by-product, ROH, from the reaction is the same as the solvent used.

Phosphoric acid is normally obtained commercially as an approximately 85% aqueous solution. It may be used as such for the preparation of the metal organic phosphate but the small quantity of water present means that the final binder solution is not completely anhydrous; however, this was not found to be a disadvantage but a completely anhydrous system can readily be obtained. The reaction of phosphoric oxide, $P_2O_5$, with water provides phosphoric acid and consequently an aqueous phosphoric acid solution may be dehydrated by the addition of the required amount of $P_2O_5$ according to the following equation:

$$3H_2O + P_2O_5 \rightarrow 2H_3PO_4$$

Aluminum organic phosphate solutions may also be obtained when totally anhydrous phosphoric acid, prepared as described above, is used in the preparations.

The solution of aluminum orgaic phosphate thus obtained may be used directly as a binder solution by the addition of a lubricious refractory filler, for example, finely-divided graphite, followed by suitable blending such as a high-shear stirring or ballmilling to give a smooth uniform coating compos ition. The coating composition is then deposited on the metal substrate such as by spraying to form a continuous imperforate thin layer. The coating and underlying substrate must then be heated to at least 200° C. for a short period of time to evaporate residual solvent and convert the aluminum organic phosphate to a substantially inorganic aluminum phosphate by thermal degradation. It should be noted that the ratio of aluminum to phosphorus remains unchanged after degradation and, for example, if one mole of alkoxide was initially reacted with three moles of phosphoric acid to give an aluminum organic phosphate, the degradation product will retain the aluminum to phosphorus ratio of 1 to 3.

In specific cases when aluminum methoxide $Al(OCH_3)_3$ or aluminum methoxy-ethylate $Al(OC_2H_4OCH_3)_3$ were reacted with anhydrous phosphoric acid at aluminum to phosphorus ratios greater than or equal to 1.0 to 2.5, the products were completely soluble and clear viscous solutions were obtained. When 85% phosphoric acid was used, solutions were only obtained at ratios greater than 1.0 to 2.5; at 1.0 to 2.5 a colloidal suspension was obtained.

The highest inorganic phosphate of aluminum is the metaphosphate in which the metal to phosphorus ratio is 1.0 to 3.0. Binder solutions prepared with ratios higher than this will, therefore, contain excess phosphoric acid; however, it is desirable to avoid excess phosphoric acid.

The preferred metal to phosphorus ratio in these coatings is therefore 1.0 to between 2.6 to 3.0.

EXAMPLE I

PREPARATION OF ALUMINUM ORGANIC PHOSPHATE WITH Al/P AT 1.0/3.0

Phosphoric oxide (85 g: 0.6 mole) was added slowly to stirred aqueous 85% phosphoric acid solution (207 g: 1.8 mole) at room temperature. An exothermic reaction took place and ultimately a clear slightly viscous solution was obtained.

Methoxyethanol (300 ml) was then added to the acid solution after cooling to room temperature and this was followed by the slow addition of aluminum methoxyethylate (252 g: 1.0 mole) in methoxyethanol (50 g) with vigorous stirring. An exothermic reaction ensued and ultimately a clear slightly viscous solution was obtained.

Sufficient methoxyethanol was then added to give a total weight of product of 880 g. This contained the equivalent of $Al_2O_3$ (51 g) and $P_2O_5$ (213 g) giving a total solids content of 30 weight percent with an Al/P ratio of 1.0/3.0.

EXAMPLE II

PREPARATION OF ALUMINUM ORGANIC PHOSPHATE WITH Al/P AT 1.0/2.77

In like manner, phosphoric oxide (71 g: 0.5 mole) was added to phosphoric acid solution (173 g: 1.5 mole) and to this was added aluminum methoxyethylate (227 g: 0.9 mole). This product was made up to a total weight of 890 g and was a clear viscous solution which contained the equivalent of $Al_2O_3$ (46 g) and $P_2O_5$ (177 g), this corresponding to a total solids content of 25 weight percent with an Al/P ratio of 1.0/2.77.

EXAMPLE III

PREPARATION OF ALUMINUM ORGANIC PHOSPHATE WITH Al/P AT 1.0/2.5

In like manner, phosphoric oxide (71 g: 0.5 mole) was added to phosphoric acid solution (173 g: 1.5 mole) and to this was added aluminum methoxyethylate (252 g: 1.0 mole). The product was made up to a total weight of 910 g and was a clear viscous solution which contained the equivalent of $Al_2O_3$ (51 g) and $P_2O_5$ (177 g), this corresponding to a total solids content of 25 weight percent with an Al/P ratio of 1.0/2.5.

EXAMPLE IV

PREPARATION OF ALUMINUM ORGANIC PHOSPHATE WITH Al/P AT 1.0/2.77 IN METHANOL

In like manner, phosphoric oxide (71 g: 0.5 mole) was added to phosphoric acid solution (173 g: 1.5 mole) and to this was added aluminum methoxide (108 g: 0.9 mole) and methanol (539 g). A slightly viscous clear solution was obtained which contained the equivalent of $Al_2O_3$ (46 g) and $P_2O_5$ (177 g) in a total weight of 890 g, this corresponding to a total solids content of 25 weight percent with an Al/P ratio of 1.0/2.77.

EXAMPLE V

PREPARATION OF ALUMINUM ORGANIC PHOSPHATE WITH Al/P AT 1.0/3.0

Aluminum methoxy-ethylate (252 g: 1.0 mole) in methoxyethanol (200 g) was added slowly to phosphoric acid (85%, 346 g, 3.0 mole) in methoxyethanol (80 g) with vigorous stirring. An exothermic reaction took place and ultimately a clear viscous solution was obtained. This contained the equivalent of $Al_2O_3$ (51 g) and $P_2O_5$ (213 g) in a total weight of 878 g corresponding to a solids content of 30 weight percent at an Al/P ratio of 1.0/3.0.

EXAMPLE VI

PREPARATION OF ALUMINUM ORGANIC PHOSPHATE WITH Al/P AT 1.0/2.77

In like manner, aluminum methoxyethylate (252 g: 1.0 mole) in methoxyethanol (100 g) was added to phosphoric acid (85%, 320 g: 2.77 mole) in methoxyethanol (98 g). There was obtained a clear viscous solution containing the equivalent of $Al_2O_3$ (51 g) and $P_2O_5$ (197 g) in a total weight of 820 g corresponding to a solids content of 30 weight percent at an Al/P ratio of 1.0/2.77.

EXAMPLE VII

PREPARATION OF ALUMINUM ORGANIC PHOSPHATE WITH Al/P AT 1.0/2.6

In like manner, aluminum methoxy-ethylate (252 g: 1.0 mole) in methoxyethanol (135 g) was added to phosphoric acid (85%, 300 g: 2.6 mole) in methoxyethanol (100 g). There was obtained a viscous solution containing the equivalent of $Al_2O_3$ (51 g) and $P_2O_5$ (185 g) in a total weight of 787 g corresponding to a solids content of 30 weight percent at an Al/P ratio of 1.0/2.6.

EXAMPLE VIII

PREPARATION OF ALUMINUM ORGANIC PHOSPHATE WITH Al/P AT 1.0/2.5

In like manner, aluminum methoxyethylate (252 g): 1.0 mole) in methoxyethanol (146 g) was added to phosphoric acid (288 g: 2.5 mole) in methoxyethanol (100 g). There was obtained a viscous, milky, colloidal solution containing the equivalent of $Al_2O_3$ (51 g) and $P_2O_5$ (177.5 g) in a total weight of 762 g corresponding to a solids content of 30 weight percent at an Al/P ratio of 1.0/2.5.

EXAMPLE IX

PREPARATION OF ALUMINUM ORGANIC PHOSPHATE WITH Al/P AT 1.0/3.0

Aluminum methoxide (120 g: 1.0 mole) was added slowly to phosphoric acid (85%, 346 g, 3.0 mole) in methanol (412 g) with vigorous stirring. An exothermic reaction took place and the methoxide slowly went into solution. A clear, slightly-viscous solution was ultimately obtained which contained the equivalent of $Al_2O_3$ (51 g) and $P_2O_5$ (213 g) in a total weight of 878 g corresponding to a solids content of 30 weight percent at an Al/P ratio of 1.0/3.0.

EXAMPLE X

PREPARATION OF ALUMINUM ORGANIC PHOSPHATE GRAPHITE COATING SUSPENSION 200 g of aluminum organic phosphate solution from Example VII was diluted with 100 g methoxyethanol and 40 g of synthetic graphite of average particle size 5 microns was added. The mixture was then vigorously stirred with a high shear stirrer for 30 minutes. A smooth uniform suspension was obtained which had a total solids content of 30 weight percent with a graphite to binder ratio of 40-60.

EXAMPLE XI

USE OF ALUMINUM ORGANIC PHOSPHATE GRAPHITE COATING IN GLASS FORMING

The coating composition from Example X was sprayed at room temperature onto cast iron mold blanks which had been cleaned by sand blasting and the blanks were then heated to 300° C. for a few minutes. Smooth uniform coatings resulted which were approximately 2 mil thick.

The coated blanks were then run on a two-section double gob IS machine in the manufacture of sodalime silicate glass bottles for periods of 20–40 hours with no swabbing. The blanks were then removed and the wear rates of the coatings were measured. There were found to average 0.032 mil/hour.

With a coating thickness of 2 mil, this corresponds to a coating life of about 60 hours.

In the forming of sodalime glassware with uncoated blanks, swabbing is normally carried out every 7-15 minutes. The advantage of the organic phosphate coating is therefore readily apparent.

MAGNESIUM ALUMINUM ORGANIC PHOSPHATE SOLUTIONS

Aqueous phosphate binder solutions containing both aluminum and magnesium are not in general use because high ratios of phosphoric acid are required to keep the magnesium in solution. These solutions are, therefore, strongly acidic and cannot be employed along with suitable fillers for coating and applications on reactive substrates such as cast iron or steel.

The invention described herein also involves the preparation of a magnesium aluminum organic phosphate material which is soluble in an anhydrous organic solvent, and which on heating converts to a totally inorganic magnesium aluminum phosphate degradation product. Because the new system is non-aqueous, it is non-acidic, and may be used on reactive substrates, with finely-divided fillers such as graphite, to give smooth uniform coatings. These coatings have been shown to be excellent solid film lubricants in mold blank applications.

Suitable magnesium aluminum phosphate binder solutions in anhydrous organic solvents may be prepared in two ways, as follows:

First, a magnesium aluminum double alkoxide of general formula $MgAl_2(OR)_8$, where R represents an alkyl group $C_nH_{2n+1}$ or alkoxyethyl group $C_nH_{2n+1}OC_2H_4$, where n is from 1 to 4, is reacted with phosphoric acid, either 85% or anhydrous, in a solvent such as anhydrous methoxyethanol. Generally mixtures are prepared where one mole of double alkoxide is reacted with six to eight moles of acid and the resultant products are clear, viscous, colorless solutions at a solids content of about 30 weight percent. The structure of these products is complex, but they contain metal-oxygen-phosphorous bonds formed by reaction of alkoxy groups with hydroxy groups on the acid, together with residual alkoxy and hydroxy groups analagous to the structures formed with aluminum alone as described previously.

The second method of preparation involves first the reaction of magnesium oxide, hydroxide or carbonate with all of the phosphoric acid to give a clear solution of a soluble magnesium phosphate in excess phosphoric acid. This reaction product is then reacted with an aluminum alkoxide in the presence of an anhydrous solvent such as methoxyethanol. A clear, viscous colorless solution of a complex metal organic phosphate is obtained similar in structure to the product obtained in the method above. One advantage of this method is that the proportions of magnesium and aluminum may be adjusted independently in contrast to the former method where the ratio is fixed at 1:2 because of the double alkoxide.

When these binder solutions are blended with graphite, normally within the range of 30–70 weight percent graphite, a suspension is obtained which may be sprayed in fine particle form on mold blanks at room temperature. A smooth, hard, solid film lubricant coating is then obtained after heating at approximately 200° C. for a few minutes.

EXAMPLE XII

PREPARATION OF MAGNESIUM ALUMINUM ORGANIC PHOSPHATE SOLUTION

Magnesium aluminum methoxyethylate, $MgAl_2(OCH_2CH_2OCH_3)_8$ (131.5 g, 0.278 mole) in methoxyethanol (185 g) was added to phosphoric acid (85%), 224 g, 1.94 mole) with vigorous stirring. An exothermic reaction took place and a clear, viscous solution was obtained in about one hour. This corresponds to a 33 weight percent solids content equivalent to $MgAl_2O_4$ (39.5 g) and $P_2O_5$ (138 g), the ratio Mg:Al:P being 1.0:2.0:7.0.

EXAMPLE XIII

PREPARATION OF MAGNESIUM ALUMINUM ORGANIC PHOSPHATE SOLUTION

Magnesium basic carbonate (47 g=0.5 mole MgO) was added in increments with stirring to phosphoric acid (85%, 440 g: 3.8 mole) in methoxyethanol (220 g). A clear solution was ultimately obtained and to this was added a solution of aluminum methoxyethylate (242 g: 1.0 mole) in methoxyethanol (70 g) with vigorous stirring. A clear, viscous solution was finally obtained which was made up to a total weight of 974 g by the addition of more methoxyethanol. This corresponds to a 35 weight percent solid content equivalent to $MgAl_2O_4$ (71 g) and $P_2O_5$ (270 g), the ratio Mg:Al:P being 1.0:2.0:7.6.

EXAMPLE XIV

PREPARATION OF MAGNESIUM ALUMINUM ORGANIC PHOSPHATE SOLUTION

Phosphoric oxide (47.3 g: 0.33 mole) was slowly added to stirred aqueous 85% phosphoric acid solution (115 g: 1.0 mole) at room temperature. An exothermic reaction took place and ultimately a clear slightly viscous solution was obtained. Methoxyethanol (200 g) was then added followed by magnesium aluminum methoxyethylate (141 g: 0.21 mole) in methoxyethanol (120 g) with vigorous stirring. A clear viscous solution was ultimately obtained and this was made up to a total weight of 740 g by the addition of methoxyethanol. This corresponds to a 20 weight percent solids content equivalent to $MgAl_2O_4$ (30 g) and $P_2O_5$ (118 g) the ratio Mg:Al:P being 1.0:2.0:8.0.

EXAMPLE XV

PREPARATION OF MAGNESIUM ALUMINUM ORGANIC PHOSPHATE-GRAPHITE COATING SUSPENSION 150 g of magnesium aluminum organic phosphate solution from Example XII was diluted with methoxyethanol (100 g) and 50 g of synthetic graphite of average particle size 5 microns was added. The mixture was then stirred under high shear for 10 minutes and a smooth uniform suspension was obtained. This contained equal weights of binder and graphite with a total solids content of 33-⅓ weight percent.

EXAMPLE XVI

USE OF MAGNESIUM ALUMINUM ORGANIC PHOSPHATE GRAPHITE COATING IN GLASS FORMING

The composition described in Example XV was sprayed at room temperature onto cast iron mold blanks which had been cleaned by sand blasting and the blanks were heated to 300° C. for a few minutes. Smooth uniform coatings approximately 1.0 to 1.3 mil thick were obtained.

The coated blanks were then run on a single section, triple cavity IS forming machine producing sodalime silicate glass bottles. No swabbing was used and the blanks were removed after periods of seven to twelve hours. The wear rates of the coatings were then measured and found to average 0.029 mil/hour. This corresponds to a coating life of 35 to 45 hours on coatings 1.0–1.3 mil thick; thicker coatings would be expected to last longer.

A similar composition containing 60% binder and 40% graphite was sprayed onto mold blanks for use in forming 500 ml capacity borosilicate glass bottles. These were run on an eight-section, single cavity IS forming machine; no swabbing was used and the blanks ran for 18 hours before forming was terminated for other reasons.

Forming of borosilicate glass requires temperatures considerably higher than those necessary for sodalime glass and in this operation, swabbing is normally carried out every 5 minutes when blanks are uncoated. The advantage of the organic phosphate coating is therefore readily apparent.

Whereas, graphite is the preferred lubricious filler with both the aluminum and magnesium aluminum organic phosphate binder solutions, other useful coatings may be prepared in which all or part of the graphite is replaced by other fillers such as boron nitride, carbon black, molybdenum or tungsten disulfides, iron oxide, molybdenum, tungsten, chromium and carbides thereof. Also, silica, mica, talc and clay in finely-ground form can be used as the filler.

Although most of the aforesaid examples state that the coating and underlying substrate are heated to about 300° C. for a short period to form the firmly-adherent degradation product, it is also possible to convert the coating by heating to at least about 200° C. for longer periods to form the solid film lubricant layer.

Various modifications may be resorted to within the spirit and scope of the appended claims.

I claim:

1. A process wherein molten glass is shaped in a glass forming mold, said mold having a lubricated glass forming surface, the improvement wherein said glass forming surface is coated with a continuous imperforate solid film lubricant layer comprised of the heated degradation product of a metal organic phosphate having a finely-divided lubricous filler dispersed therein, said solid film layer being present in sufficient thickness to provide a glass releasing quality and extended wear lift to said layer within said mold.

2. A glass forming mold for shaping molten glass consisting of a hollow cavity having a lubricated glass forming surface, the improvement wherein said glass forming surface is coated with a continuous imperforate solid film lubricant layer comprised of the heated degradation product of a metal organic phosphate having a finely-divided lubricous filler dispersed therein, said solid film layer being present in sufficient thickness to provide a glass releasing quality and extended wear life to said layer within said mold cavity.

3. The improvement in accordance with claim 2, wherein said metal to phosphorus ratio in said metal organic phosphate comprises about 1.0/2.0 to 3.5, and the metal of said metal organic phosphate is selected from the group consisting of aluminum, magnesium and aluminum in combination, and mixtures thereof.

4. The improvement in accordance with claim 2, wherein said finely-divided lubricous filler to degraded metal organic phosphate ratio ranges from 30–70 to 70–30.

5. The improvement in accordance with claim 2, wherein said finely-divided lubricous filler is selected from the group consisting of graphite, boron nitride, carbon black, silica, mica, talc, clay, molydenum, tungsten, chromium, molydenum disulfide, tungsten disulfide, lead sulfide, and mixtures thereof.

6. The improvement in accordance with claim 2, wherein said finely-divided lubricous filler is graphite.

7. The improvement in accordance with claim 2, wherein said finely-divided lubricous filler is boron nitride.

8. The improvement in accordance with claim 2, wherein said metal organic phosphate is aluminum organic phosphate.

9. The improvement in accordance with claim 2, wherein said metal organic phosphate is magnesium aluminum organic phosphate.

10. The improvement in accordance with claim 2, wherein said metal organic phosphate is dissolved in an anyhdrous organic solvent selected from the group consisting of methoxyethanol, ethoxyethanol, butoxyethanol, methanol, and mixtures thereof.

11. In a process wherein molten glass is shaped in a glass-forming mold, said mold having a wear-resistant lubricated glass forming surface, the improvement wherein said glass forming surface is coated with a non-aqueous, non-acidic organic solution of a metal organic phosphate having a finely-divided lubricous filler dispersed therein, said coating being converted by heating to at least 200° C. into a degradation product constituting a solid film lubricant layer having sufficient thickness to provide a glass releasing quality and extended wear life to said lubricant layer within said molded.

12. The improvement in accordance with claim 11, wherein said degraded metal organic phosphate and said lubricous filler are present on about a 50—50 weight percent basis.

13. The process in accordance with claim 11, wherein said metal organic phosphate is selected from the group consisting aluminum organic phosphate and magnesium aluminum organic phosphate.

14. The process in accordance with claim 11, wherein said finely divided lubricous filler comprises graphite.

15. The process in accordance with claim 11, wherein said finely-divided lubricous filler comprises boron nitride.

16. The process in accordance with claim 11, wherein said metal organic phosphate is dissolved in an anhydrous organic solvent selected from the group consisting of methoxyethanol, ethoxyethanol, butoxyethanol, methanol, and mixtures thereof.

17. A process of treating a glass forming mold for forming molten glass charges to provide a wear-resistant lubricated glass forming surface comprising the steps of coating the glass forming surface of said mold with a non-aqueous, non-acidic organic solution of a metal organic phosphate having a finely-divided lubricous filler dispersed therein, heating the said forming surface and coating to a temperature of at least 200° C. for a period of at least a few minutes to form a degradation product constituting a solid film lubricant layer having sufficient thickness to provide a glass releasing quality and extended wear life to said lubricant layer within said mold.

18. A process of treating a molten glass contacting surface to provide a wear-resistant lubricated glass contacting surface comprising the steps of coating the glass contacting surface with a non-aqueous, non-acidic organic solution of a metal organic phosphate having a finely-divided lubricous filler dispersed therein, heating the said glass contacting surface and coating to a temperature of at least about 200° C. for a period of at least a few minutes to form a degradation product constituting a solid film lubricant having sufficient thickness to provide a glass releasing quality and extended wear life to said lubricant layer on said glass contacting surface.

* * * * *